(12) United States Patent  
Hebert et al.

(10) Patent No.: US 8,836,766 B1  
(45) Date of Patent: Sep. 16, 2014

(54) METHOD AND SYSTEM FOR ALIGNMENT OF A PATTERN ON A SPATIAL CODED SLIDE IMAGE

(71) Applicant: Creaform Inc., Lévis (CA)

(72) Inventors: Patrick Hebert, Québec (CA); Félix Rochette, Québec (CA)

(73) Assignee: Creaform Inc., Levis, Quebec (CA)

( * ) Notice: Subject to any disclaimer, the term of this patent is extended or adjusted under 35 U.S.C. 154(b) by 185 days.

(21) Appl. No.: 13/699,773

(22) PCT Filed: Nov. 2, 2012

(86) PCT No.: PCT/IB2012/056112  
§ 371 (c)(1),  
(2), (4) Date: Nov. 26, 2012

(87) PCT Pub. No.: WO2013/076605  
PCT Pub. Date: May 30, 2013

Related U.S. Application Data

(60) Provisional application No. 61/563,280, filed on Nov. 23, 2011.

(51) Int. Cl.  
*H04N 13/02* (2006.01)  
*H04N 17/00* (2006.01)

(52) U.S. Cl.  
CPC ............................. *H04N 13/0275* (2013.01)  
USPC .............................. 348/46; 348/135; 348/187

(58) Field of Classification Search  
None  
See application file for complete search history.

(56) References Cited

U.S. PATENT DOCUMENTS

| | | | | |
|---|---|---|---|---|
| 6,816,187 | B1 * | 11/2004 | Iwai et al. | 348/187 |
| 7,023,473 | B2 * | 4/2006 | Iwai et al. | 348/187 |
| 7,724,379 | B2 * | 5/2010 | Kawasaki et al. | 356/603 |
| 7,768,656 | B2 | 8/2010 | Lapa et al. | |
| 8,032,327 | B2 | 10/2011 | Hebert et al. | |
| 2004/0233280 | A1 * | 11/2004 | Aoyama | 348/135 |
| 2010/0046801 | A1 * | 2/2010 | Ishiyama | 382/106 |

FOREIGN PATENT DOCUMENTS

CA     2656163 A     9/2006

OTHER PUBLICATIONS

Blais, "A Review of 20 Years of Range Sensor Development", Journal of Electronic Imaging, Jan. 2004, pp. 231-243, vol. 13 (1), NRC.

(Continued)

*Primary Examiner* — Behrooz Senfi  
*Assistant Examiner* — Mohammed Jebari  
(74) *Attorney, Agent, or Firm* — Fasken Martineau

(57) ABSTRACT

A method for preparing a spatial coded slide image in which a pattern of the spatial coded slide image is aligned along epipolar lines at an output of a projector in a system for 3D measurement, comprising: obtaining distortion vectors for projector coordinates, each vector representing a distortion from predicted coordinates caused by the projector; retrieving an ideal pattern image which is an ideal image of the spatial coded pattern aligned on ideal epipolar lines; creating a real slide image by, for each real pixel coordinates of the real slide image, retrieving a current distortion vector; removing distortion from the real pixel coordinates using the current distortion vector to obtain ideal pixel coordinates in the ideal pattern image; extracting a pixel value at the ideal pixel coordinates in the ideal pattern image; copying the pixel value at the real pixel coordinates in the real slide image.

7 Claims, 11 Drawing Sheets

(56) References Cited

OTHER PUBLICATIONS

Zhang et al., "Rapid Shape Acquisition Using Color Structured Light and Multi-pass Dynamic Programming", pp. 1-13. Available on the internet at http://grail.cs.washington.edu/projects/moscan/paper.pdf on Nov. 23, 2012.

Vuylsteke et al., "Range Image Acquisition with a Single Binary-Encoded Light Pattern", IEEE Transaction on Pattern Analysis and Marchine Intelligence, Feb. 1990, pp. 148-164, vol. 12, No. 2.

Heikkilä, "Geometric camera calibration using circular control points", Pattern Analysis and Machine Intelligence, IEEE Transactions on, Oct. 2000, pp. 1066-1077, vol. 22, No. 10.

Ouellet et al., "Geometric Calibration of a Structured Light System Using Circular Control Points", in Proceedings of the Fourth 3D Data Processing, Visualization and Transmission, Jun. 2008, pp. 1-8, Proceedings of 3DPVT, Atlanta, GA, USA.

Salvi et al, "Pattern Codification Strategies in Structured Light Systems", Pattern Recognition, 2004, pp. 827-849, vol. 37 Elsevier Ltd.

* cited by examiner

METHOD AND SYSTEM FOR ALIGNMENT OF A PATTERN ON A SPATIAL CODED SLIDE IMAGE

TECHNICAL FIELD

The present invention generally relates to the field of three-dimensional scanning of the surface geometry of an object, and, more particularly, to structured light stereoscopy.

BACKGROUND OF THE ART

Three-dimensional scanning and digitization of the surface geometry of objects is commonly used in many industries and services, and their applications are numerous. A few examples of such applications are inspection and measurement of shape conformity in industrial production systems, digitization of clay models for industrial design and styling applications, reverse engineering of existing parts with complex geometry, interactive visualization of objects in multimedia, applications, three-dimensional documentation of artwork and artifacts, human body scanning for better orthotics adaptation, biometry or custom-fit clothing.

The shape of an object is scanned and digitized using a ranging sensor that measures the distance between the sensor and a set of points on the surface. Different principles have been developed for range sensors. Among them, interferometry, time-of-flight and triangulation-based principles are well-known principles that are each more or less appropriate depending on the requirements on accuracy, the stand-off distance between the sensor and the object, and the required depth of field.

Some triangulation-based range sensors are generally adequate for close range measurements, such as inferior to a few meters. Using this type of apparatus, at least two rays that converge to the same feature point on the object are obtained from two different viewpoints separated by a baseline distance. From the baseline and two ray directions, the relative position of the observed point can be recovered. The intersection of both rays is determined using the knowledge of one side length and two angles in the triangle, which actually is the principle of triangulation in stereovision. The challenge in stereovision is to efficiently identify which pixels correspond to each other in each image.

To simplify the problem, one can replace one of the light detectors (cameras) with a light projector that outputs a set of rays in known directions. In this case, it is possible to exploit the direction of the projected rays and each detected ray reflected on the object surface to solve the triangle. It is then possible to calculate the coordinates of each observed feature point relative to the basis of the triangle.

Although specialized light detectors can be used, digital CCD or CMOS cameras are typically used.

For the projector, the light source can be a coherent source (laser) or non-coherent source (e.g. white light) projecting a spot, a light plane or many other possible patterns of projection including a full-field pattern. A full-field pattern is a 2D pattern which can cover a portion or the whole of the projector's 2D field of illumination. In this case, a dense set of corresponding points can be matched in each image. Use of a light projector facilitates the detection of reflected points everywhere on the object surface so as to provide a dense set of measured surface points. However, the more complex the pattern will be, the greater the challenge will be to efficiently identify corresponding pixels and rays.

For this reason, one will further exploit properties from the theory of projective geometry. It has been well known in the field for at least 30 years in the case of two views that one may exploit epipolar constraints to limit the search of corresponding pixels to a single straight line, as opposed to the search in the entire image. This principle is widely exploited both in passive and active (with a projector) stereovision. One example of this usage is a system in which two cameras and a laser projector projecting a crosshair pattern are used. The arrangement of the two cameras and the laser is such that each of the laser planes composing the crosshair is aligned within an epipolar plane of each of the cameras. Thus, one of the laser planes will always be imaged in the same position in one image, independently of the observed geometry. It is then possible to disambiguate between the two laser planes in the image. This is a non-traditional application of epipolar geometry in structured light systems.

The epipolar geometry can be computed from calibration parameters or after matching a set of points in two images. Thus, given a point in one image, it is possible to calculate the parameters of the equation of the straight line (the epipolar line) in the second image where the corresponding point will lay. Another approach consists in rectifying the two images, which means all epipolar lines will be horizontal and aligned. Rectifying images is thus advantageous since no further calculation needs to be performed for identifying pixels on the epipolar lines. Image rectification can be applied by software or even by cautiously aligning the relative orientation of one or the two cameras (or projector). In this case, the approach is referred to as hardware alignment.

Several examples of hardware aligned cameras and projectors exist where the projector projects vertical stripes and the camera is aligned in such a way that the epipolar lines are horizontal. This type of alignment has been used in several other structured light systems exploiting Gray code vertical patterns. Projecting vertical stripes is less demanding on the alignment of the projector and cameras, but reduces the spatial density of points from a single projected frame. A full-field code can also be projected. The projector and camera are again aligned in such a way that the coded pattern along each line is projected along the epipolar lines in the projector slide. Under these circumstances, the scene geometry has nearly no effect on the direction and vertical separation of the row-coded pattern. These coded patterns will remain along a single line independently of the distance to the object. However, the relevant information to capture 3D measurements will be retrieved in the deformation of the code along the epipolar lines. This alignment with the epipolar lines makes it possible to project a different code along each line.

Unfortunately, there is an unresolved issue with the application of the principle of epipolar geometry. Its reliability varies depending on the type and quality of the projector lens. Actually, it does not account for lens distortion. In presence of lens distortion either for the projector and the camera, epipolar lines will not be straight lines. They will be curved and cannot be assumed to strictly result from the intersection of the epipolar plane with the image plane. Distortion is generally more important for short range systems requiring lenses with short focal lengths. Although it can be corrected after calibration through software calculation for the camera, it cannot be corrected afterwards for the projector. In this case, a code initially aligned along a straight line (epipolar) in the projector image (hereafter referred to as slide image) will not be physically projected along a straight line after the lens and will thus not result in a good alignment along the epipolar line in the image of the camera. For most lenses, distortion increases towards the side and corners of the images. One will either lose these points, compensate with larger bands for encoding the signal along the distorted epipolar lines (thus reducing resolution of measurement) or apply more complex calculations that will take away the initial goal of simplifying matching.

SUMMARY

According to one broad aspect of the present invention, there is provided a method for preparing a spatial coded slide image in which a pattern of the spatial coded slide image is aligned along epipolar lines at an output of a projector in a system for 3D measurement of a shape of an object, having the projector and a camera in full-field structured light, comprising: obtaining a set of distortion vectors for projector coordinates of the projector, each the distortion vector representing a distortion from predicted coordinates caused by the projector; retrieving an ideal pattern image, wherein the ideal pattern image is an ideal image of the spatial coded pattern aligned on ideal epipolar lines; creating a real slide image by, for each real pixel coordinates of the real slide image, retrieving a current distortion vector from the set using the real pixel coordinates; removing distortion from the real pixel coordinates using the current distortion vector to obtain ideal pixel coordinates in the ideal pattern image; extracting a pixel value at the ideal pixel coordinates in the ideal pattern image; copying the pixel value at the real pixel coordinates in the real slide image.

In one embodiment, the step of creating a real slide image includes creating an electronic version of the real slide image and providing the electronic version to a programmable projector.

In one embodiment, the step of extracting a pixel value includes interpolating the pixel value.

In one embodiment, the pixel value is a level value.

According to another broad aspect of the present invention, there is provided a method for facilitating matching of coded patterns between a projected image and a captured image in a system for 3D measurement of a shape of an object, having a projector and a camera in full-field structured light, comprising: calibrating the projector and the camera for intrinsic and extrinsic parameters; preparing a spatial coded slide image in which a pattern of the spatial coded slide image is aligned along epipolar lines; projecting the spatial coded pattern on a scene object using the projector; observing the spatial coded pattern on the object using the camera to generate a camera image; processing the camera image to match codes with the projected image;

In one embodiment, the method further comprises undistorting and rectifying the camera image prior to the processing the camera image.

According to still another broad aspect of the present invention, there is provided a method for setting up a system for 3D measurement of a shape of an object, having a projector with a fixed slide mask and a camera in full-field structured light, comprising: setting the lens aperture and focus; preparing a slide with a spatial coded slide image, mounting the slide rigidly with the projector lens and aligning a center of the slide with an optical axis of the lens; adjusting rotation around the optical axis of the lens and the translation of the projector along the optical axis of the lens so as to align the pattern code along the epipolar lines.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which:

FIG. 1 includes FIG. 1A, FIG. 1B and FIG. 1C, wherein FIG. 1A is an illustration of a grid, FIG. 1B is an illustration of the effect of barrel-type radial lens distortion and FIG. 1C is an illustration of the effect of pincushion radial lens distortion;

FIG. 3 includes FIG. 3A and FIG. 3B, wherein

FIG. 8 includes FIG. 8A and FIG. 8B, wherein

FIG. 9 includes FIG. 9A and FIG. 9B, wherein

DETAILED DESCRIPTION

In order to find corresponding matches between the pattern projected by a projector and the pattern detected in the image captured by the camera, the present invention allows aligning higher resolution code, even near the sides and corners of the image. The projector lens will distort the image built on the projector slide. The slide is the physical imager component that is located before the optics of the projector. It is either a transmitting or reflecting imager component. The pattern codes aligned along ideal epipolar lines on the slide will thus result in curved lines instead of straight lines once projected through the lens. The method therefore aligns the pattern codes with the actual epipolar lines after the lens instead of aligning the pattern codes on the hypothetical non-distorted straight lines on the projector slide. The distortion induced by the lens optics of the projector is first modeled and the distortion model is then applied to deform the coded patterns initially aligned along straight lines. The resulting coded patterns on the slide are thus pre-curved. The distortion of the projection lens then occurs as modeled and the coded patterns on the image captured by the camera are straightened.

Figure 1:
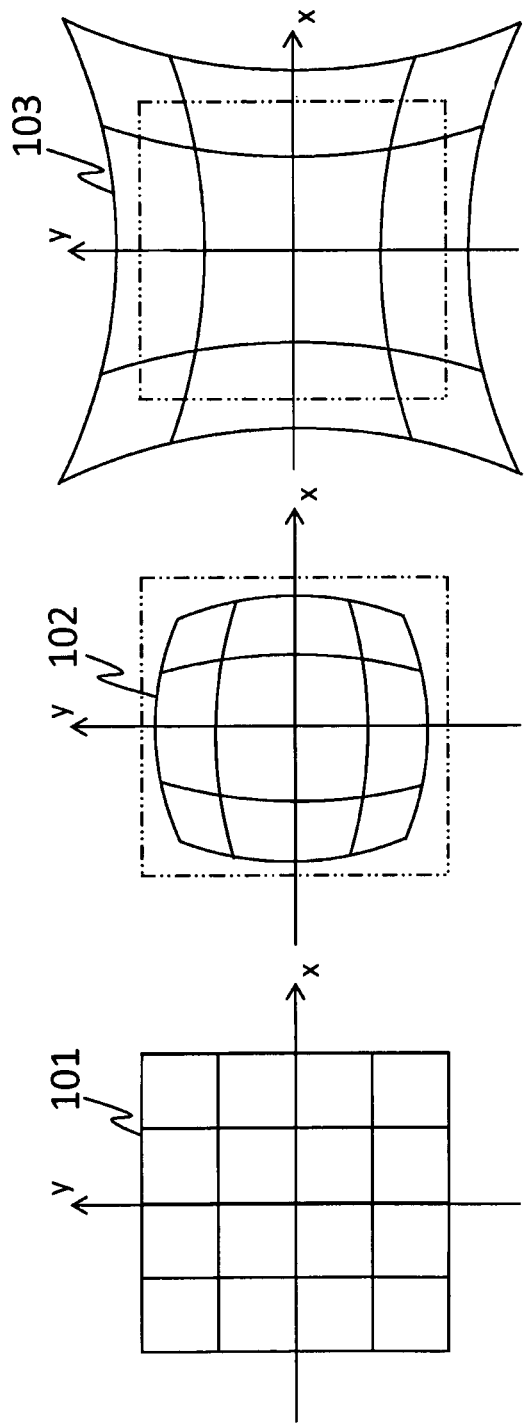

FIG. 1 shows an effect of radial lens distortion on a regular grid 101 shown in FIG. 1A. Radial distortion can lead to either barrel type distortion, shown at 102 in FIG. 1B, or pincushion type distortion, shown at 103 in FIG. 1C. The effect is well-known. Straight lines are curved and the effect will be more important for short focal lengths. Although radial distortion is a very common type of distortion that is compensated for in machine vision and photogrammetry, other types of lens distortion can also be compensated for. One other such example lens distortion is tangential distortion.

The projection model for both the camera and the projector is a pinhole with lens distortion compensation. The pinhole model describes the relationship between a 3D point $\tilde{P}_w=[x, y, z, 1]^T$ in the world reference frame, w, and the corresponding image point $\tilde{a}=[u, v, 1]^T$. Here, the tilde superscript indicates homogeneous coordinates. The relation is a projection defined as $\lambda\tilde{a}=K[R\ t]\tilde{P}_w$. In this equation, the matrix $$K = \begin{bmatrix} \alpha & 0 & u_0 \\ 0 & \beta & v_0 \\ 0 & 0 & 1 \end{bmatrix}$$

includes the camera intrinsic parameters, where $(u_0, v_0)$ are the coordinates of the principal point, $\alpha$ and $\beta$ are the scale factors of the image horizontal and vertical axes respectively, (R, t) are the 3×3 rotation matrix and 3×1 translation vector describing the transformation from the world to the camera reference frame, and $\lambda$ is an arbitrary scale factor. R and t encode the extrinsic parameters. In practice, due to lens distortion, a point is not imaged at coordinates a predicted by the projection, but at distorted coordinates $a_d$. To compensate for the distortion, the projection model is augmented with radial terms (e.g. $k_1$, $k_2$ when two terms are used) and optionally with two tangential terms (e.g. $p_1$, $p_2$). These additional intrinsic parameters are represented in a vector d. The coordinates $a_d$ can then be corrected using the following relation $a=a_d-\delta(a_d, d)$ where $$\delta(a_d, d) = \begin{bmatrix} x_d(k_1 r_d^2 + k_2 r_d^4) + 2p_1 x_d y_d + p_2(r_d^2 + 2x_d^2) \\ y_d(k_1 r_d^2 + k_2 r_d^4) + 2p_2 x_d y_d + p_1(r_d^2 + 2y_d^2) \end{bmatrix}$$

and $$a_d = (x_d, y_d), [x_d, y_d, 1]^T = K^{-1}[u_d, v_d, 1]^T$$

and $$r_d^2 = x_d^2 + y_d^2.$$

Conversely, it is also useful to obtain the distorted coordinates from ideal, non-distorted pixel coordinates. In this case, $a_d$ is sought but $\delta$ is a function of $a_d$ and only a is given. There is no direct method to inverse the distortion function unless it is explicitly computed at calibration. An inverse model based on a Taylor series approximation can be used. However, for short focal lenses with significant distortion, this method increases the complexity. Indeed, additional terms are needed in the series development. An alternative method is to recursively approximate the inverse solution. The additional calculation is not relevant in the context of offline calibration. The recursion equations are:

$$a_d \approx a + \partial(a_d, d) \approx a + \partial(a + \partial(a_d, d), d) \approx \ldots$$

About 10 iterations are used to generate the inverse mapping. The intrinsic parameters, including distortion, as well as the geometric transformation between the projector and the camera can be calculated beforehand at calibration stage. The parameters describing this geometric transformation are referred to as the extrinsic parameters. A few methods are proposed in the art to obtain these parameters for a projector-camera combination. After obtaining the parameters, it is possible to calculate both the distorted and non-distorted pixels given one or the other.

Figure 2:
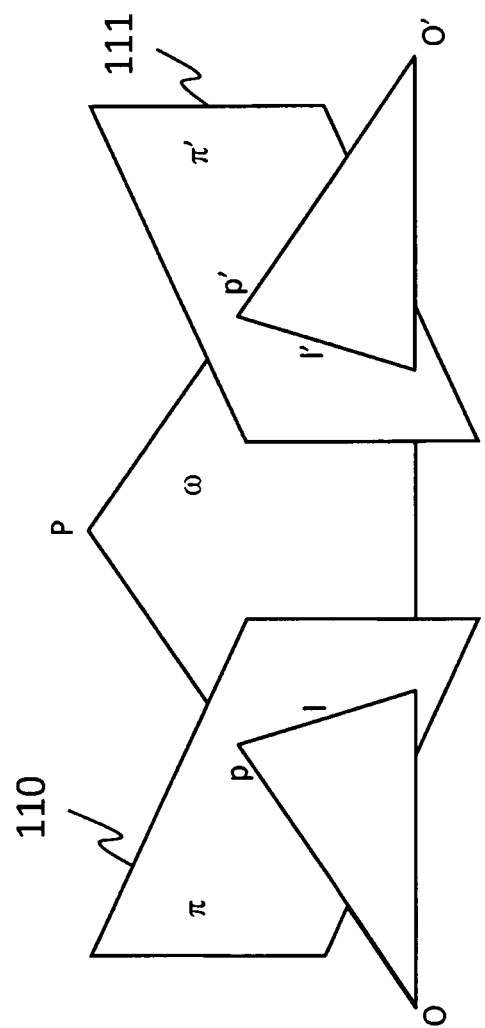
FIG. 2 is a representation of the epipolar geometry.

The projective geometry of two, cameras, or equivalently the combination of one camera and a projector, describes the relationship between the positions of a point in one image with its corresponding point in the second image. Given a point in one image, its corresponding point lays along a straight line in the second image. This is illustrated in FIG. 2, where points O and O' are the projection centers of the devices and P is a point in 3D space. The set composed of P, O and O' defines an epipolar plane $\omega$ that intersects both image planes $\pi$ and $\pi'$ along lines l and l'. Lines l and l' are epipolar lines. So given a point p in the image 110, its corresponding point, p', in image 111 would be found along l'. Conversely, the corresponding point to p' in image 110 would be found along line l. Given a point in one image, it is possible to calculate the equation of the corresponding epipolar line using either the essential or the fundamental matrix. These matrices can be obtained after calibration. Interestingly, the orientation of the epipolar lines is dictated by the vergence of the stereo arrangement. More precisely, when both image planes $\pi$ and $\pi'$ are parallel, the epipolar lines will all be parallel as well. In the particular case of two parallel image planes $\pi$ and $\pi'$ that are also parallel to the baseline and defined as the segment joining the two projection centers, the epipolar lines will be parallel to this baseline.

Figure 3A:
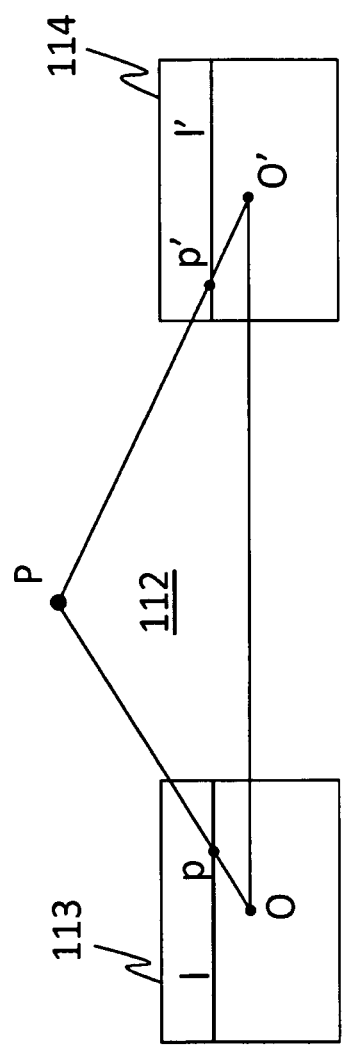
FIG. 3A depicts a rear view of a rectified configuration and FIG. 3B depicts a top view of a rectified configuration.
Figure 3B:
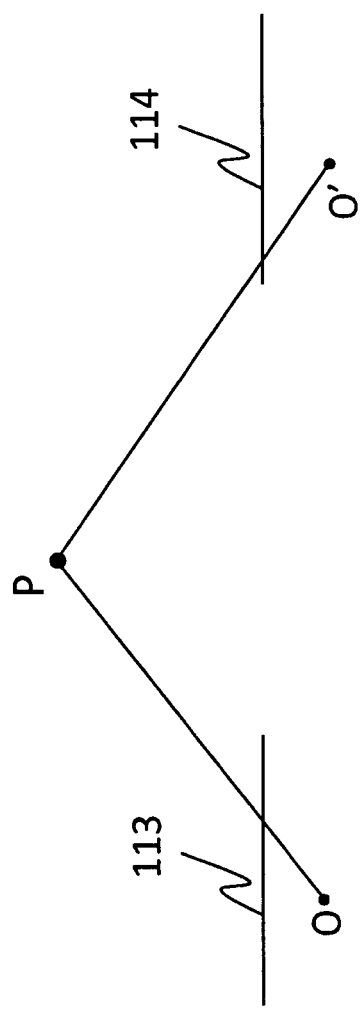
Figure 4:
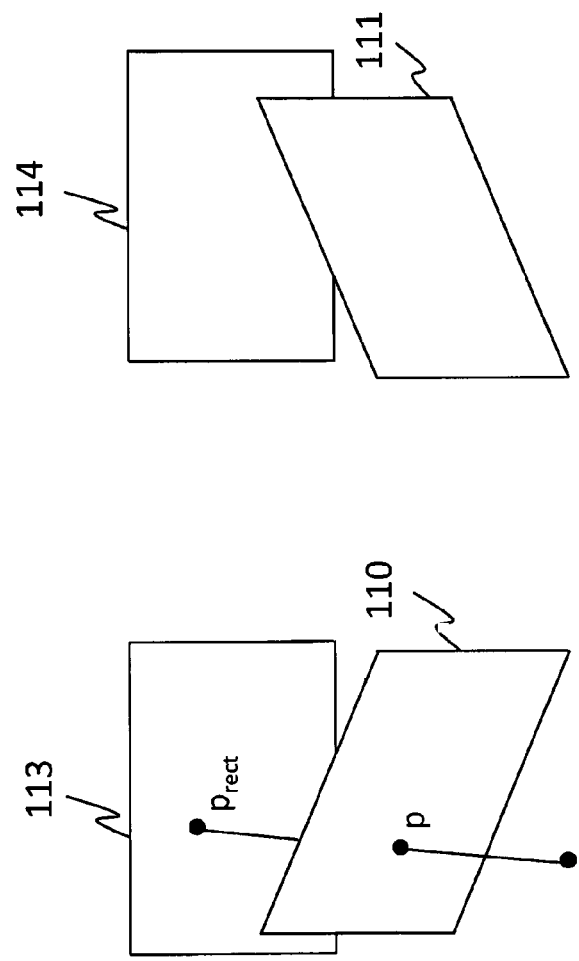
FIG. 4 is an illustration of the rectification process.

Referring now to FIG. 3A, image planes 113 and 114 can be adjusted in such a way that the epipolar lines will lay on the same lines in the images. The two image planes are then referred to as rectified. The epipolar plane is shown at 112. In FIG. 3B, a top view of the two parallel image planes is shown. When the projector-camera arrangement does not match this exact configuration, it is also possible to define two virtual planes in the exact configuration and transform the actual images into rectified images by software calculation. The principle is illustrated in FIG. 4 where a pixel p in original image 110 is copied to its corresponding position, $p_{rect}$, in the rectified image 113. The same principle would apply to the pair of images 111 and 114.

In a full-field structured light system where a spatial coded pattern is projected to facilitate decoding, a method is proposed to align the codes of the projector along the epipolar lines. The code then encodes a non-ambiguous position on a line compared with a position in the whole image. A system with spatial codes nearly aligned along the epipolar can be proposed to facilitate correspondence matching. In the presence of distortion, one cannot align the codes along the epipolar lines by simply using the epipolar geometry. In fact, the epipolar lines are not straight lines on the slide and they cannot be obtained simply by intersecting the epipolar plane with the image (slide) planes. The codes can be aligned along curved lines that will be straight (in a light plane) once outputted from the projector.

As will be readily understood, only the codes present on the projector slide need to be adjusted for projector distortion. These codes will be aligned with the epipolar lines at the output of the projector. The image captured by the camera will not suffer from the projector distortion. The image captured by the camera can simply be processed to remove the camera distortion caused by the camera optics, if need be.

Figure 5:
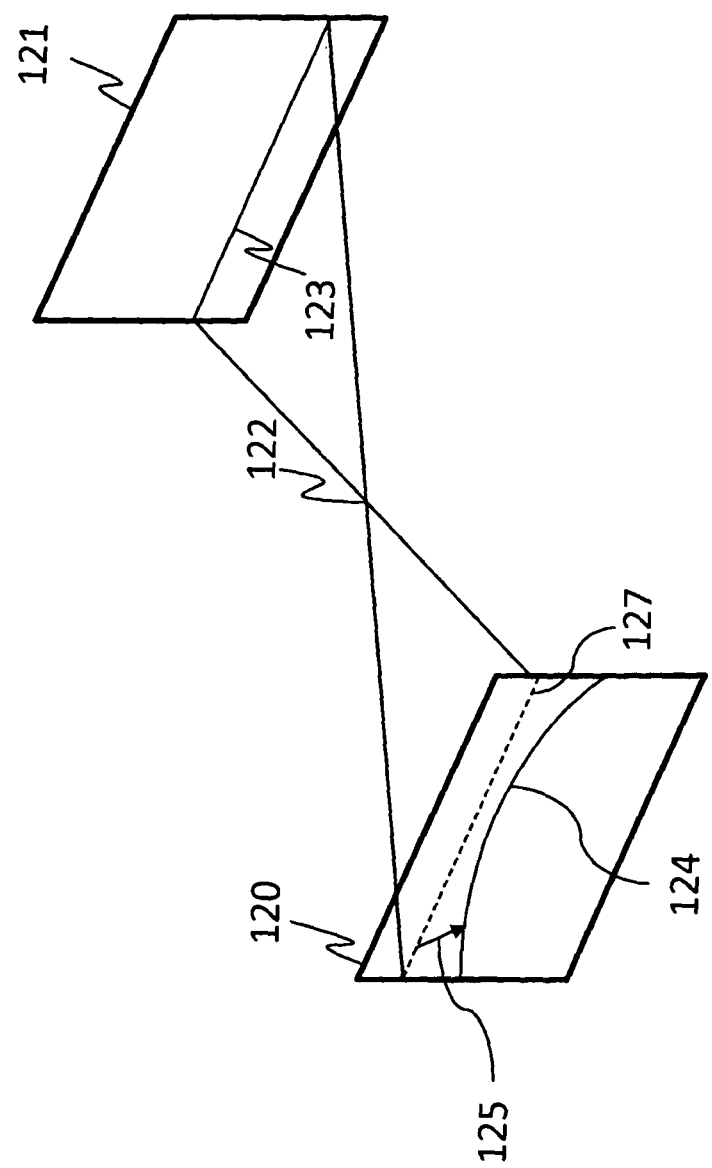
FIG. 5 illustrates distortion compensation applied to the slide image.
Figure 6:
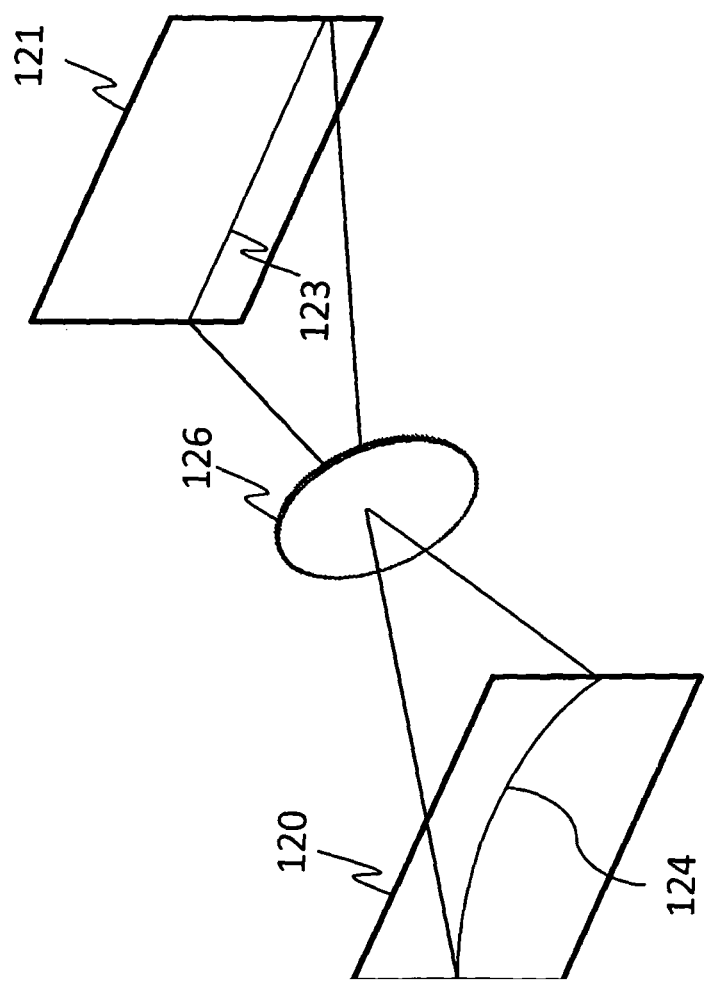
FIG. 6 illustrates the deformation of an epipolar line by a real lens.

In order to make sure that coded patterns are projected along the epipolar lines, the arrangement composed of the projector and camera is first calibrated for the intrinsic and extrinsic parameters. Then, considering an ideal image of the coded patterns on all ideal epipolar lines, typically in the rectified configuration, the image slide that is to be projected is the same image where the position of each pixel is corrected in the direction of $\delta(a,d)$. This is illustrated in FIG. 5. The ideal pinhole model is shown at 122. The output image after the pinhole is shown at 121 while the projected image is shown at 120. In an ideal case without distortion by the projector, a spatial code provided on line 127 of the projected image 120 would be projected at line 123 on the output image 121. Line 127 would be chosen such that line 123 would be aligned on the epipolar line. However, to compensate for the distortion by the projector, rather than being provided on ideal line 127, the spatial code is rather aligned along one of the actual projected curves 124. This ensures that, after distortion, it is still projected at line 123 and therefore aligned on the epipolar line. For a given point, the vector between the ideal and distorted pixels is shown at 125. FIG. 6 illustrates the resulting effect with a real lens 126.

Figure 7:
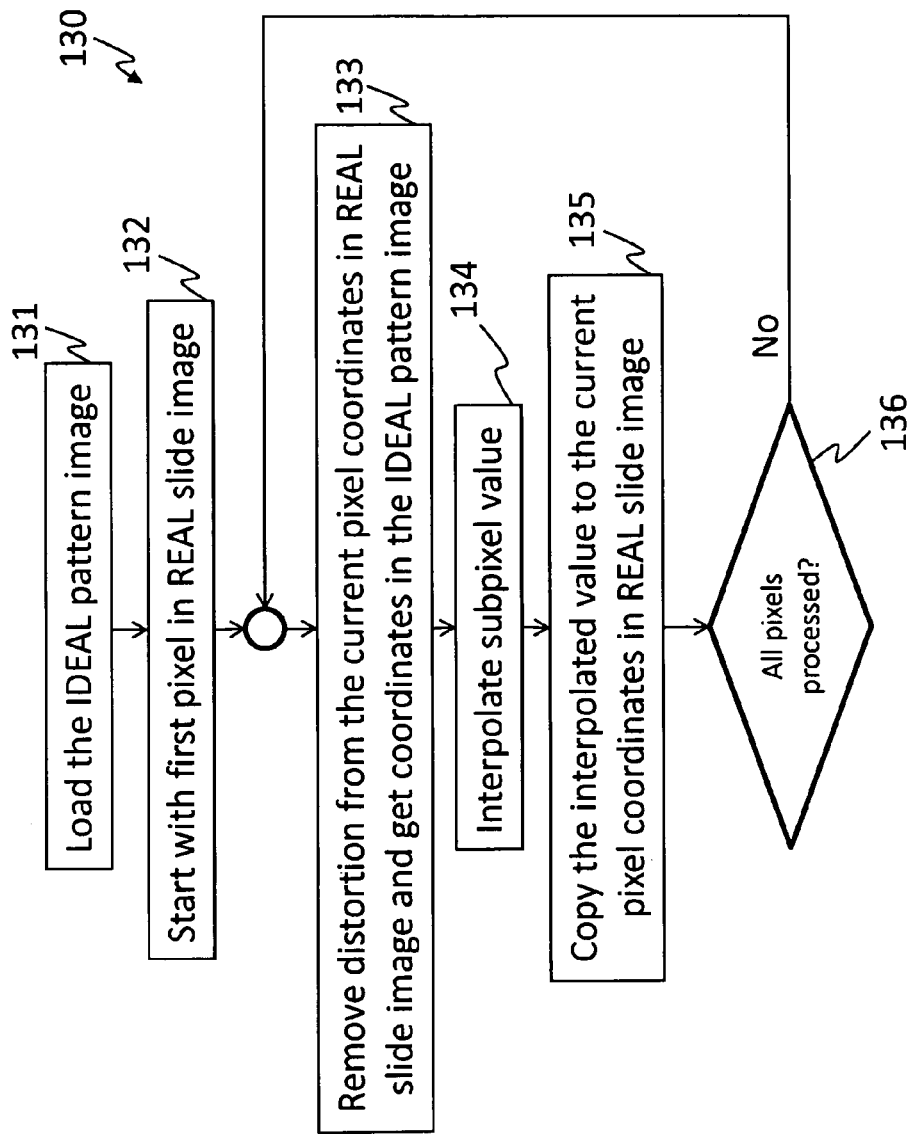
FIG. 7 is a flowchart of an example method for producing the real pattern.

An example of a method to produce a real slide image to be carried out in practice is shown at 130 in FIG. 7. Distortion vectors for the projector coordinates are first obtained. These can be determined, for example, using the projector model detailed above. As will be readily understood, other projector models could be used without departing from the invention with more or less radial and/or tangential terms and/or with other terms of distortion. Each distortion vector represents a distortion from predicted coordinates caused by the projector at the particular projector coordinates. After loading the ideal pattern image into memory 131, one will process, at 132, each pixel of the real slide by first removing distortion from the real pixel coordinates using the distortion vectors and obtaining the pixel coordinates in the ideal reference image 133. In this example, the optical axis will intersect the slide at its center. This intersection point defines the principal point of the slide. After calculating these pixel coordinates in the ideal pattern image, the pixel value from the ideal pattern image at these pixel coordinates will be obtained. This pixel value can be directly extracted (0-order interpolation) from the nearest pixel in the ideal image or it can be obtained using subpixel interpolation 134. The pixel value may be a level value representing color and/or intensity. The pixel value is finally copied to the current pixel in the real slide image 135. This process is repeated for all pixels of the real slide image 136.

This way, one makes sure that the coded patterns are projected along the epipolar lines even in presence of lens distortion. Then, the pattern will be reflected on the scene objects before being observed in the camera image. The camera image will be undistorted and rectified by software based on the well-known principle illustrated in FIG. 4 before the image is processed to match codes with the projector. Alternately, the camera image could be processed directly without applying rectification. The distance to the object can then be obtained from the disparity along the epipolar line corresponding to the matched points. In other words, from the corresponding positions in the projector slide and camera image, it is possible to obtain the 3D coordinates of the scene point by triangulation. The basis of the triangle corresponds to the baseline.

Figure 8B:
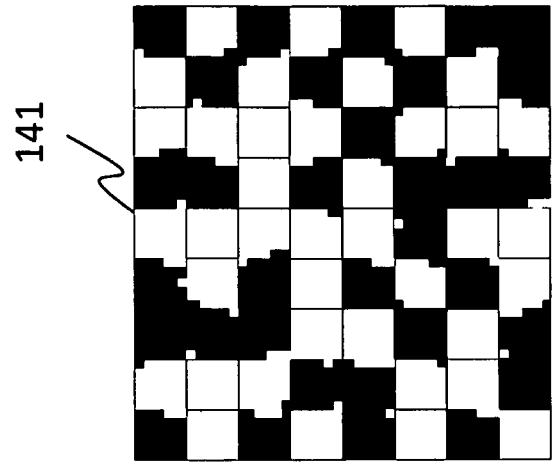
FIG. 8A is an illustration of a binary pattern and FIG. 8B is an illustration of the effect of thresholding after interpolation.
Figure 8A:
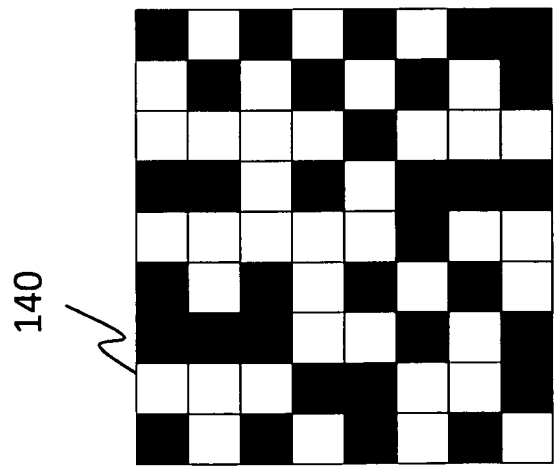

Some coded patterns may be binary images to increase the signal-to-noise ratio or to get increased precision when 3D positions are calculated from points located at the image edges. Although the process that has just been described will work well to compensate lens distortion, the resulting image is obtained after subpixel interpolation, which will introduce gray level pixels even if the ideal pattern is binary. Imposing a binary value by thresholding will deform the shape of the edge in the projected image. In FIG. 8A, an example of an ideal spatial code is shown at 140. At 141 in FIG. 8B, the potential effect of thresholding is shown.

Figure 9B:
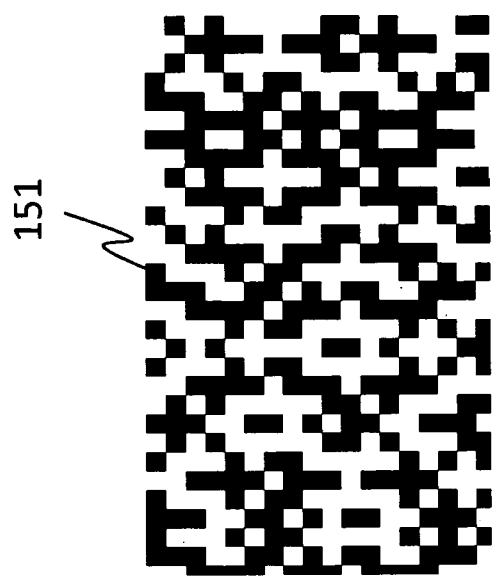
FIG. 9B depicts the corresponding ideal section.
Figure 9A:
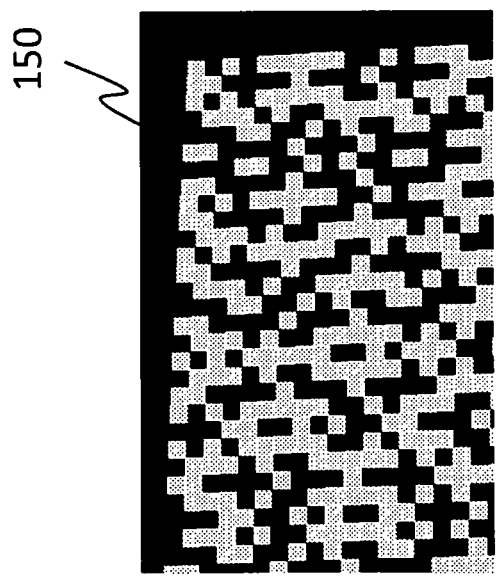
FIG. 9A depicts a pre-distorted slide section along with its corresponding ideal section.

To preserve binary patterns while compensating for distortion, some further steps can be carried out. It is possible to better preserve vertical edges in an ideal binary pattern composed of rectangles. One way to do that is to initialize the pattern image with value 1 before calculating the distorted center of each of the 0 state rectangles and drawing it on the slide. FIG. 9A illustrates a section of the resulting slide at 150. The expected projected pattern that will be "undistorted" by the optics is shown at 151 in FIG. 9B. Two radial terms ($k_1$ and $k_2$) were used to generate the slide section shown at 150 in FIG. 9A. In this example, the modeled lens is a fixed focal length Fujinon 9 mm, model HF9HA-1B f/1.4 exploited at f/2 and focalized at a distance of 350 mm. The values obtained for $k_1$ and $k_2$ after calibration are $k_1$=−0.003162295864393 and $k_2'$=0.000023351397144. More continuous horizontal edges can also be obtained after dividing each rectangle into several narrower subrectangles with the same height and applying the same procedure to each of these subrectangles. This is especially interesting for a fixed slide mask where the resolution is usually higher than most programmable projectors. Other embodiments of the method are also possible to reach the same goal.

When the projector slide is programmable, the pattern can be reconfigured at runtime. In this case, the pattern code can be adapted based on the calibration parameters.

Figure 10:
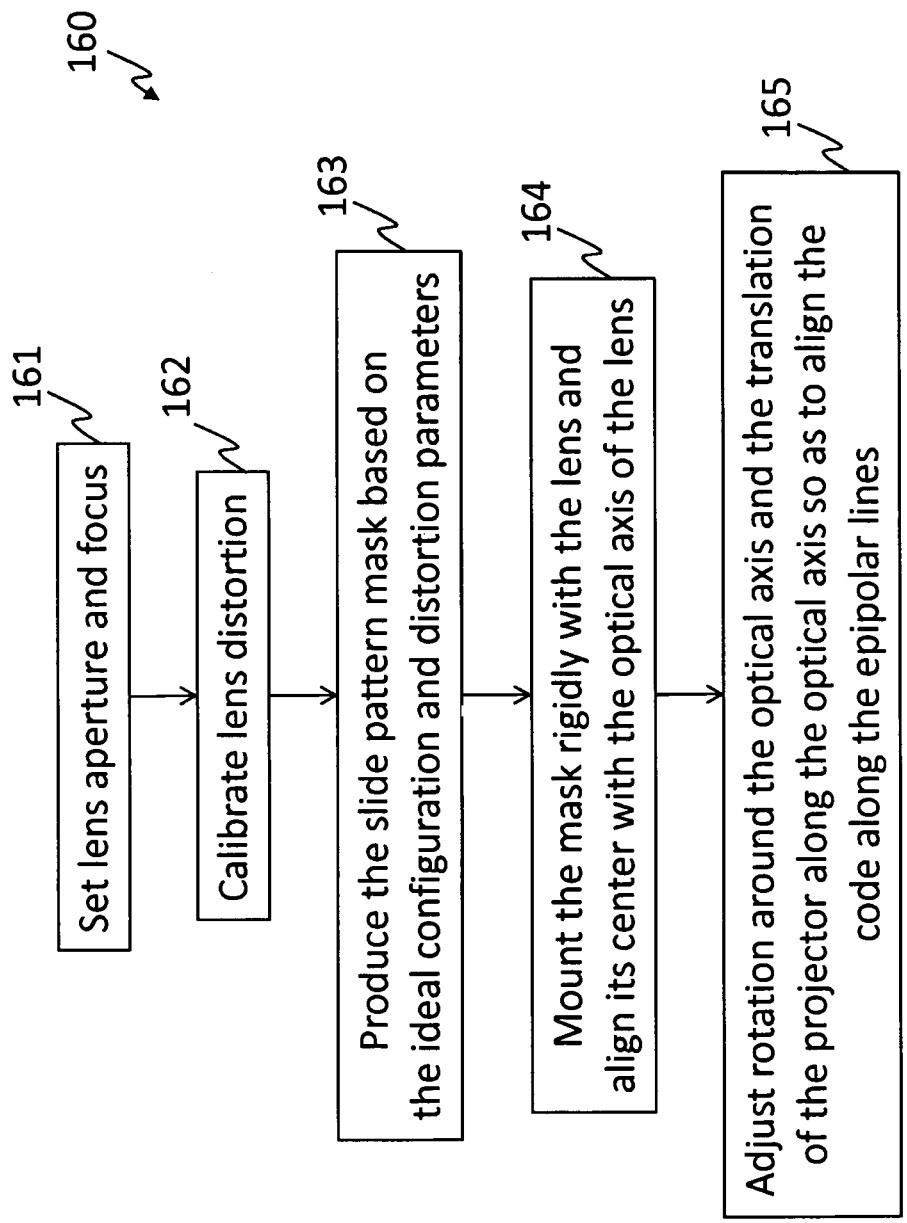
FIG. 10 is a flowchart of an example method for adapting a fixed slide mask.

Conversely, when a projector is mounted with a fixed pattern on a slide, the epipolar geometry can be obtained from the mechanical design of the arrangement. An example method 160 for setting up a system for 3D measurement is shown in FIG. 10. In order to consider lens distortion, the distortion parameters of the lens are calibrated beforehand at 162, after the aperture and focus have been adjusted at 161. Then, the fixed slide mask is created based on these parameters and using the example procedure detailed in FIG. 7 and represented in FIG. 10 at 163. This procedure was carried out to produce the image shown at 150 in FIG. 9A with the Fujinon lens described above. In the next step, the mask is mounted with the lens, and the center of distortion is precisely aligned at 164. This is done with the help of a calibrated camera that captures the projected pattern on a plane. The projection matrix then reduces to a homography added with the same distortion model. A homography, H, is a one-to-one projective mapping between 2D coordinates of the mask and the camera image. It is thus possible to align the principal point of the slide with the optical axis of the lens. Actually, when the optical axis intersects with the principal point of the slide, the following expression is minimized:

$$\phi = \sum_\Omega \|a_p - Ha_c\|^2.$$

In this expression, $a_p$ is a point on the projector slide after removing distortion using the projector distortion model, while $a_c$ is a point in the camera image after removing the distortion using the camera distortion model. $Ha_c$ is the point $a_c$ mapped to the undistorted projector slide. $\Omega$ is a set of matched points between the projector slide and the camera image. Finally, the assembled projector combining the source, the slide mask and the projecting lens is rotated around its optical axis and its position is fine tuned to optimize the alignment of the code along the epipolar lines. This is shown at 165. To do so, the camera mounted on the sensor is used. The camera image is rectified and the alignment of the codes along horizontal lines is ensured.

Although the above description relates to example embodiment as presently contemplated by the inventors, it will be understood that the invention in its broad aspect includes equivalents of the elements described herein.

The embodiments described above are intended to be exemplary only. The scope of the invention is therefore intended to be limited solely by the appended claims.

We claim:

1. A method for preparing a spatial coded slide image in which a pattern of said spatial coded slide image is aligned along epipolar lines at an output of a projector in a system for 3D measurement of a shape of an object, having the projector and a camera in full-field structured light, comprising:

obtaining a set of distortion vectors for projector coordinates of said projector, each said distortion vector representing a distortion from predicted coordinates caused by said projector;

retrieving an ideal pattern image, wherein said ideal pattern image is an ideal image of the spatial coded pattern aligned on ideal epipolar lines;

creating a real slide image by, for each real pixel coordinates of the real slide image, retrieving a current distortion vector from said set using said real pixel coordinates;

removing distortion from said real pixel coordinates using the current distortion vector to obtain ideal pixel coordinates in the ideal pattern image;

extracting a pixel value at the ideal pixel coordinates in the ideal pattern image;

copying the pixel value at the real pixel coordinates in the real slide image.

2. The method as claimed in claim 1, wherein said creating a real slide image includes creating an electronic version of said real slide image and providing said electronic version to a programmable projector.

3. The method as claimed in claim 1, wherein said extracting a pixel value includes interpolating said pixel value.

4. The method as claimed in claim 1, wherein said pixel value is a level value.

5. A method for facilitating matching of coded patterns between a projected image and a captured image in a system for 3D measurement of a shape of an object, having a projector and a camera in full-field structured light, comprising:

calibrating the projector and the camera for intrinsic and extrinsic parameters;

preparing a spatial coded slide image in which a pattern of said spatial coded slide image is aligned along epipolar lines by obtaining a set of distortion vectors for projector coordinates of said projector, each said distortion vector representing a distortion from predicted coordinates caused by said projector;

retrieving an ideal pattern image, wherein said ideal pattern image is an ideal image of the spatial coded pattern aligned on ideal epipolar lines;

creating a real slide image by, for each real pixel coordinates of the real slide image, retrieving a current distortion vector from said set using said real pixel coordinates;

removing distortion from said real pixel coordinates using the current distortion vector to obtain ideal pixel coordinates in the ideal pattern image;

extracting a pixel value at the ideal pixel coordinates in the ideal pattern image;

copying the pixel value at the real pixel coordinates in the real slide image;

projecting the spatial coded pattern on a scene object using the projector;

observing the spatial coded pattern on the object using the camera to generate a camera image;

processing the camera image to match codes with the projected image.

6. The method as claimed in claim 5, further comprising undistorting and rectifying the camera image prior to said processing the camera image.

7. A method for setting up a system for 3D measurement of a shape of an object, having a projector with a fixed slide mask and a camera in full-field structured light, comprising:

setting the lens aperture and focus;

carrying the steps of claim 1;

mounting said slide rigidly with the projector lens and aligning a center of said slide with an optical axis of the lens;

adjusting rotation around the optical axis of the lens and the translation of the projector along the optical axis of the lens so as to align the pattern code along the epipolar lines.

* * * * *